United States Patent Office.

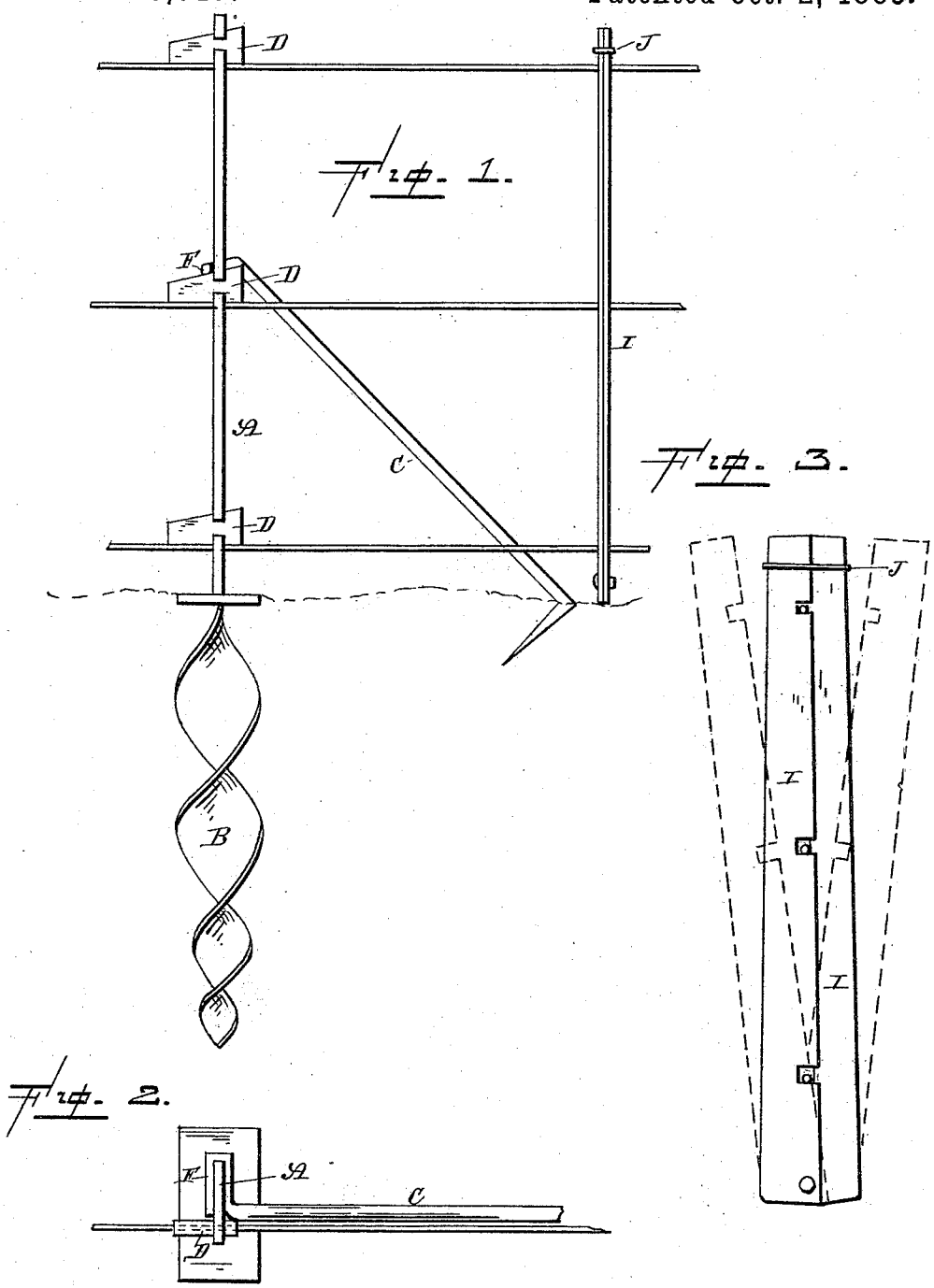

JOHN JOHNSON, OF ATKINSON, ILLINOIS.

FENCE-POST.

SPECIFICATION forming part of Letters Patent No. 286,017, dated October 2, 1883.

Application filed April 7, 1883. (No model.)

*To all whom it may concern:*

Be it known that I, JOHN JOHNSON, of Atkinson, in the county of Henry and State of Illinois, have invented certain new and useful Improvements in Fence-Posts; and I do hereby declare the following to be a full, clear, and exact description of the invention, such as will enable others skilled in the art to which it pertains to make and use it, reference being had to the accompanying drawings, which form part of this specification.

My invention relates to an improvement in fence-posts; and it consists in a metallic post having its lower end made auger-shaped, so as to be forced into the ground, in combination with a metallic brace which has one end made U-shaped, so as to catch over the edge of the post, and its other end turned at right-angles, so as to be driven into the ground, and which brace is made to both brace the post in position and to bear against the sides of the wires and brace them, as will be more fully described hereinafter.

The object of my invention is to provide a fence-post which can be readily screwed into the ground, and which is then braced rigidly in position by means of a metallic brace, which can be readily applied and removed at any time.

Figure 1 is a side elevation of my invention. Fig. 2 is a plan view of the same. Fig. 3 is a detached view of the device for supporting the wires in between the posts.

A represents the post, which is made of flat metal of any suitable thickness, and which has its lower end, B, made auger-shaped, so as to be readily forced into the ground without the necessity of making holes to receive it. In the edge of this post are made suitable openings or slots, in which the wires are inserted, and thus held rigidly in position by means of wedges or keys D, which are forced into the openings upon the top of the wire.

In order to brace the post rigidly in position against any side strains which may be brought to bear upon it, a brace, C, is used for each post. This brace consists of a metallic rod of suitable length, which has one of its ends made U-shaped, as shown at F, and the other made at right angles, so as to be driven into the ground, as shown at G. The U-shaped end of the brace is made to catch over the sides of the post, as shown, and it then extends outward in the direction of the wires. As the brace extends in the direction of the wires, it is made to bear against them, and thus serve as a brace to prevent, at least, two of the wires from vibrating to such an extent as to shake and loosen the post in the ground. This U-shaped end of the brace will be made to catch over either edge of the post, as may be desired, so as to extend in either direction.

In order to support the wires in position and prevent them from sagging down, especially where the posts are placed at a considerable distance apart, I use a supporting device composed of the two plates I, which are pivoted together at their lower ends, and which have notches in their inner edges for the wire to catch in. The upper ends of these plates are held together by any suitable clamping device, J. Before the wires can be inserted these plates must be opened outward at the top. The wires can then be placed between them, and then the plates are closed and the clamping devices slipped down over their upper ends. This device can be slipped along upon the wires from place to place, as may be preferred.

I am aware that braces have been connected to fence-posts heretofore for bracing them in position, and this I disclaim. My invention differs from them in having the U-shaped end of the brace turned at right angles, so as to catch over the edge of the post, and having the braces to extend along against the wires for the purpose of holding them in position.

Having thus described my invention, I claim—

The combination, with a flat post, A, of the brace C, having the U-shaped end F, turned at right angles to its length, for the purpose of catching over the edge of the post, and having its lower end bent, so as to enter the ground, the brace being made to extend along against the wires, so as to brace them in position, substantially as shown.

In testimony whereof I affix my signature in presence of two witnesses.

JOHN JOHNSON.

Witnesses:
JOHN F. NOWERS,
PAUL D. RANSOM.